(12) United States Patent
Dar et al.

(10) Patent No.: US 11,356,181 B2
(45) Date of Patent: Jun. 7, 2022

(54) BACKWARD PROPAGATION WITH COMPENSATION OF SOME NONLINEAR EFFECTS OF POLARIZATION MODE DISPERSION

(71) Applicant: NOKIA OF AMERICA CORPORATION, Murray Hill, NJ (US)

(72) Inventors: Ronen Dar, Hoboken, NJ (US); Cristian B. Czegledi, Lincroft, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 0 days.

(21) Appl. No.: 17/140,371

(22) Filed: Jan. 4, 2021

(65) Prior Publication Data

US 2021/0126714 A1    Apr. 29, 2021

Related U.S. Application Data

(62) Division of application No. 15/624,190, filed on Jun. 15, 2017, now Pat. No. 10,887,022.

(51) Int. Cl.
*H04B 10/58* (2013.01)
*H04B 10/60* (2013.01)
(Continued)

(52) U.S. Cl.
CPC ......... *H04B 10/60* (2013.01); *H04B 10/2543* (2013.01); *H04B 10/58* (2013.01);
(Continued)

(58) Field of Classification Search
CPC ............................ H04B 10/58; H04B 10/2543; H04B 10/6163; H04B 10/588; H04B 10/6162
See application file for complete search history.

(56) References Cited

U.S. PATENT DOCUMENTS

| 6,038,267 A | 3/2000 | Oura et al. |
|---|---|---|
| 6,462,863 B1 | 10/2002 | Atieh et al. |

(Continued)

FOREIGN PATENT DOCUMENTS

EP    3157180 A1    4/2017

OTHER PUBLICATIONS

Guiomar, Fernando Pedro, et al., "Digital Postcompensation Using Volterra Series Transfer Function," IEEE Photonics Technology Letters, 2011, vol. 23, No. 19, pp. 1412-1414.

(Continued)

*Primary Examiner* — Tanya T Motsinger
(74) *Attorney, Agent, or Firm* — Mendelsohn Dunleavy, P.C.; Yuri Gruzdkov; Steve Mendelsohn

(57) ABSTRACT

An optical transport system configured to compensate nonlinear signal distortions using a backward-propagation algorithm in which some effects of polarization mode dispersion on the nonlinear signal distortions are accounted for by employing two or more different approximations of said effects within the bandwidth of the optical communication signal. In an example embodiment, the corresponding digital signal processor (DSP) is configured to switch between different approximations based on a comparison, with a fixed threshold value, of a difference between frequencies of various optical waves contributing to the nonlinear signal distortions, e.g., through four-wave-mixing processes. In different embodiments, the backward-propagation algorithm can be executed by the transmitter's DSP or the receiver's DSP.

6 Claims, 7 Drawing Sheets

(51) Int. Cl.
*H04B 10/61* (2013.01)
*H04B 10/588* (2013.01)
*H04B 10/2543* (2013.01)

(52) U.S. Cl.
CPC .......... *H04B 10/588* (2013.01); *H04B 10/61* (2013.01); *H04B 10/6162* (2013.01); *H04B 10/6163* (2013.01)

(56) References Cited

U.S. PATENT DOCUMENTS

| | | | |
|---|---|---|---|
| 7,251,297 | B2 | 7/2007 | Agazz |
| 7,266,310 | B1 | 9/2007 | Savory et al. |
| 7,636,525 | B1* | 12/2009 | Bontu ............... H04B 10/6165 398/208 |
| 7,747,177 | B2 | 6/2010 | Chen et al. |
| 8,073,345 | B2 | 12/2011 | Chen et al. |
| 8,260,154 | B2 | 9/2012 | Chang et al. |
| 8,861,981 | B2* | 10/2014 | Liu .................... H04B 10/2543 398/208 |
| 9,020,364 | B2 | 4/2015 | Xie et al. |
| 9,048,957 | B2 | 6/2015 | Nakashima |
| 9,112,614 | B2 | 8/2015 | Randel et al. |
| 9,264,172 | B2 | 2/2016 | Rival et al. |
| 9,337,934 | B1* | 5/2016 | Agazzi ................. H04L 7/0075 |
| 9,646,116 | B2* | 5/2017 | Liu ....................... G06F 30/367 |
| 9,973,358 | B1 | 5/2018 | Mohammed et al. |
| 11,184,086 | B1* | 11/2021 | Chen ...................... H04B 10/69 |
| 2002/0172297 | A1 | 11/2002 | Ouchi et al. |
| 2003/0175034 | A1 | 9/2003 | Noe |
| 2005/0180760 | A1 | 8/2005 | Feced et al. |
| 2006/0228116 | A1 | 10/2006 | Bontu et al. |
| 2007/0147850 | A1 | 6/2007 | Savory et al. |
| 2009/0245809 | A1* | 10/2009 | Nakamoto ......... H04B 10/2507 398/159 |
| 2010/0046961 | A1 | 2/2010 | Tanimura et al. |
| 2010/0104284 | A1* | 4/2010 | Liu .......................... H04J 14/06 398/65 |
| 2010/0128774 | A1 | 5/2010 | He |
| 2010/0239254 | A1 | 9/2010 | Li et al. |
| 2010/0247099 | A1* | 9/2010 | Lowery .............. H04B 10/6163 398/79 |
| 2011/0243573 | A1 | 10/2011 | Roberts et al. |
| 2012/0070159 | A1* | 3/2012 | Ishihara ............. H04B 10/2513 398/202 |
| 2012/0114341 | A1 | 5/2012 | Hu et al. |
| 2012/0134676 | A1 | 5/2012 | Kikuchi |
| 2012/0207474 | A1 | 8/2012 | Inoue et al. |
| 2012/0216093 | A1 | 8/2012 | Djordjevic et al. |
| 2012/0263481 | A1 | 10/2012 | Ip et al. |
| 2013/0108260 | A1* | 5/2013 | Yan .................... H04B 10/2572 398/25 |
| 2013/0156443 | A1* | 6/2013 | Lowery .............. H04B 10/6163 398/141 |
| 2013/0183034 | A1 | 7/2013 | Zhang et al. |
| 2013/0308960 | A1 | 11/2013 | Hirokoshi et al. |
| 2013/0330070 | A1 | 12/2013 | Yu |
| 2014/0093255 | A1 | 4/2014 | Liu et al. |
| 2014/0099128 | A1* | 4/2014 | Mateo ................. H04B 10/6163 398/158 |
| 2014/0140707 | A1* | 5/2014 | Akiyama ................ H04J 14/06 398/183 |
| 2014/0161452 | A1* | 6/2014 | Okabe ................. H04B 10/588 398/65 |
| 2015/0003225 | A1 | 1/2015 | Ogawa et al. |
| 2015/0180586 | A1 | 6/2015 | Oota et al. |
| 2015/0195045 | A1* | 7/2015 | Zhuge ................. H04B 10/532 398/184 |
| 2015/0229410 | A1 | 8/2015 | Magri et al. |
| 2015/0288458 | A1 | 10/2015 | Honda et al. |
| 2015/0372764 | A1 | 12/2015 | Kaneda |
| 2015/0372765 | A1* | 12/2015 | Yasuda ............... H04B 10/0795 398/29 |
| 2016/0036527 | A1 | 2/2016 | Zhou |
| 2016/0036528 | A1 | 2/2016 | Zhao et al. |
| 2016/0050025 | A1* | 2/2016 | Yasuda ............... H04B 10/2513 398/65 |
| 2016/0094292 | A1 | 3/2016 | Mochizuki et al. |
| 2016/0127047 | A1 | 5/2016 | Napoli et al. |
| 2016/0233963 | A1* | 8/2016 | Zhuge ................. H04B 10/2543 |
| 2016/0241341 | A1 | 8/2016 | Endo et al. |
| 2016/0294480 | A1 | 10/2016 | Mertz et al. |
| 2017/0019178 | A1 | 1/2017 | Alic et al. |
| 2017/0041078 | A1 | 2/2017 | Le et al. |
| 2017/0237498 | A1* | 8/2017 | Essiambre ......... H04B 10/2543 398/136 |
| 2018/0076900 | A1* | 3/2018 | Le Taillandier De Gabory .......... H04B 10/588 |
| 2020/0252032 | A1* | 8/2020 | Faig ......................... H03F 3/19 |
| 2020/0328818 | A1* | 10/2020 | Razzell .............. H04B 10/6151 |
| 2020/0366380 | A1* | 11/2020 | Janicek ............ H04B 10/07951 |

OTHER PUBLICATIONS

Tanimura, Takahito, et al., "Experimental characterization of nonlinearity mitigation by digital back propagation and nonlinear polarization crosstalk canceller under high PMD condition," Optical Society of America, Optical Fiber Communication Conference and Exposition (OSA/OFC/NFOEC), and the National Fiberoptic Engineers Conference, 2011 (3 pages).
R. J. Essiambre et al., "Electronic predistortion and fiber nonlinearity," IEEE Photonics Technology Letters (PTL), 2006 Vol. 18 No. 17, pp. 1804-1806.
W. Yan et al., "Low complexity digital perturbation backpropagation," ECOC Technical Digest, Optical Society of America, 2011, ECOC, Tu.3.A.2. (3 pages).
F. P. Guiomar et al., "Mitigation of intra-channel nonlinearities using a frequency-domain Volterra series equalizer," Optics Express, 2012, vol. 20, No. 2, pp. 1360-1369.
K. V. Peddanarappagari and M. Brandt-Pearce, "Volterra series transfer function of single-mode fibers," Journal of Lightwave Technology (JLT), 1997, vol. 15, No. 12, pp. 2232-2241.
F. Yaman and G. Li, "Nonlinear impairment compensation for polarization-division multiplexed WDM transmission using digital backward propagation," IEEE Photonics Journal, 2010, vol. 2, No. 5, p. 816-832.
C. B. Czegledi et al., "Digital backpropagation accounting for polarization-mode dispersion," Optics Express 2017, vol. 25, No. 3, pp. 1903-1915.
K. Goroshko et al., "Overcoming performance limitations of digital back propagation due to polarization mode dispersion," 18th International Conference on Transparent Optical Networks (ICTON), 2016, Mo.B1.4 (4 pages).
C. B. Czegledi et al., "Polarization drift channel model for coherent fibre-optic systems," Scientific Reports, 6(21217), 2016 (11 pages).
C. B. Czegledi et al., "Temporal stochastic channel model for absolute polarization state and polarization-mode dispersion," Optical Fiber Communication Conference (OFC), 2017, Th3F.2, (3 pages).
"manner." The American Heritage(R) Dictionary of the English Language, edited by Editors of the American Heritage Dictionaries, Houghton Mifflin, 6th edition, 2016. Credo Reference, https://search.credoreference.com/content/entry/amdictenglang/manner/0?institutionld=743. Accessed Mar. 18, 2019.
Pinto, Armando, et al., "Flexible Optical Recievers", 2012 14th International Conference on Transparent Optical Networks (ICTON), pp. 1-4 (Year: 2012).
Bertran-Pardo, O., et al., "Linear and nonlinear impairment mitigation for enhanced transmission performance." 2011 Optical Fiber Communication Conference and Exposition and the National Fiber Optic Engineers Conference, pp. 1-3 (Year: 2011).
Millar, David S., et al., "Mitigation of Fiber Nonlinearity Using a Digital Coherent Receiver", Sep. 2010, IEEE Journal of Selected Topics in Quantum Electronics, vol. 16, Issue: 5, pp. 1217-1226 (Year: 2010).

\* cited by examiner

100

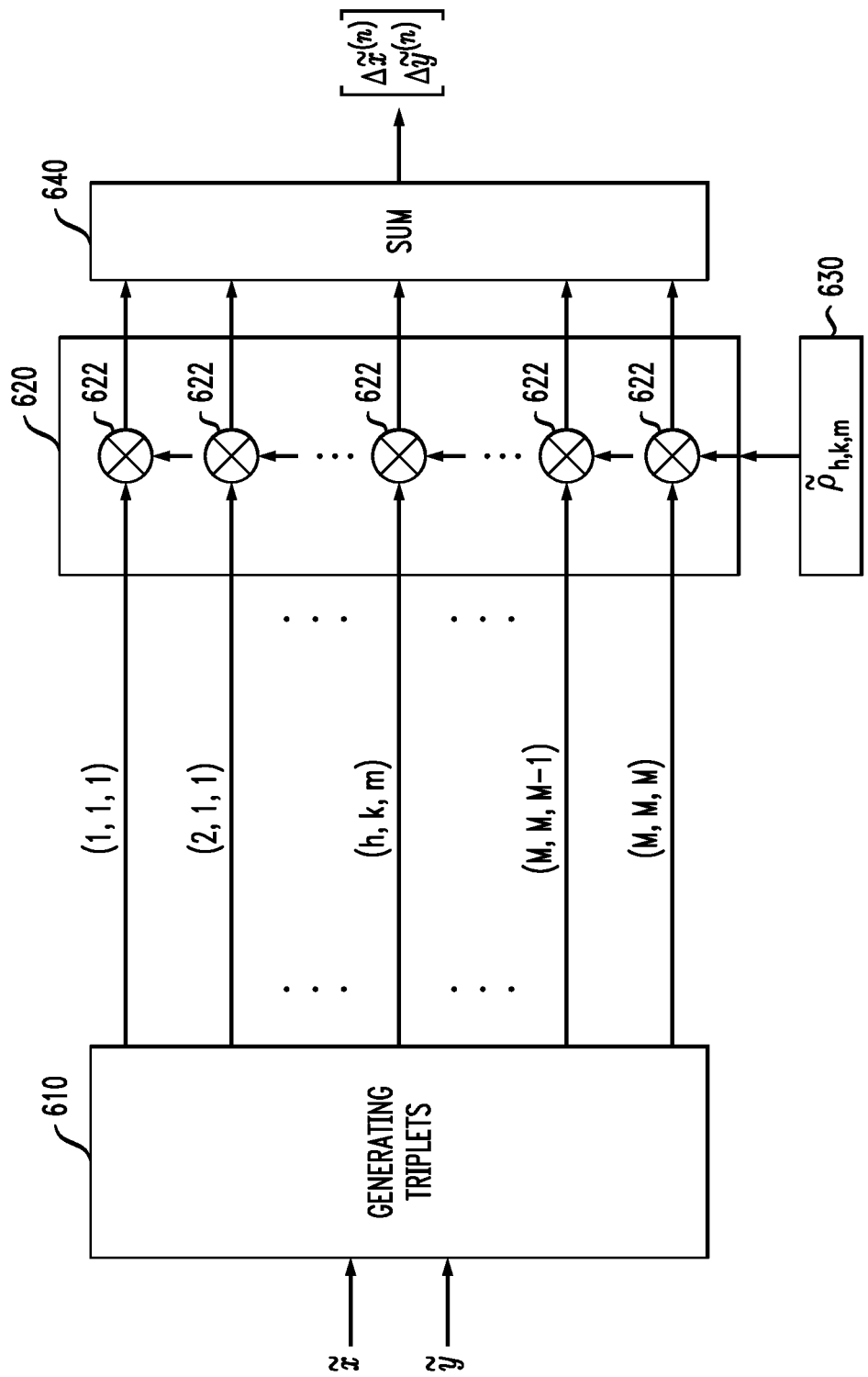

700

BACKWARD PROPAGATION WITH COMPENSATION OF SOME NONLINEAR EFFECTS OF POLARIZATION MODE DISPERSION

BACKGROUND

Field

The present disclosure relates to optical communication equipment and, more specifically but not exclusively, to at least partial electronic compensation of nonlinear distortions, including compensation of some nonlinear effects of polarization mode dispersion.

Description of the Related Art

This section introduces aspects that may help facilitate a better understanding of the disclosure. Accordingly, the statements of this section are to be read in this light and are not to be understood as admissions about what is in the prior art or what is not in the prior art.

After propagating through a length of optical fiber, the received optical signal may be distorted due to linear impairments, such as chromatic dispersion (CD) and polarization mode dispersion (PMD), and nonlinear impairments, such as the Kerr effect, including one or more of self-phase modulation (SPM), cross-phase modulation (XPM), and four-wave mixing (FWM). These distortions typically cause a detrimental increase in the bit-error rate (BER). Optical and electrical signal-processing techniques that can reduce this BER penalty are therefore desirable.

SUMMARY OF SOME SPECIFIC EMBODIMENTS

Disclosed herein are various embodiments of an optical transport system configured to compensate nonlinear signal distortions using a backward-propagation algorithm in which some effects of PMD on the nonlinear signal distortions are accounted for by employing two or more different approximations of said effects within the bandwidth of the optical communication signal. In an example embodiment, the corresponding digital signal processor (DSP) is configured to switch between different approximations based on a comparison, with a fixed threshold value, of a difference between frequencies of various optical waves contributing to the nonlinear signal distortions, e.g., through FWM processes. In different embodiments, the backward-propagation algorithm can be executed by the transmitter's DSP or the receiver's DSP.

According to an example embodiment, provided is an apparatus comprising: a coherent optical receiver that includes an optical hybrid, a plurality of light detectors, a plurality of analog-to-digital converters, and a digital signal processor, the analog-to-digital converters being configured to output a stream of digitalizations of measurements of two polarization components of a modulated optical carrier, the light detectors being configured to make the measurements on interferences of the modulated optical carrier produced by the optical hybrid; and wherein the digital signal processor comprises a first digital circuit configured to estimate, from the stream of digitalizations, intra-channel nonlinear optical distortions of the modulated optical carrier in a polarization-mode-dispersion dependent manner that gives a lower weight to some contributions to the intra-channel nonlinear optical distortions caused by interactions between frequency components of the modulated optical carrier of larger intra-channel frequency difference than to other contributions to the intra-channel nonlinear optical distortions caused by interactions between frequency components of the modulated optical carrier of smaller intra-channel frequency difference.

According to another example embodiment, provided is an apparatus comprising: an optical transmitter that includes a laser, a plurality of optical modulators, associated electrical drivers, and a digital signal processor, the optical transmitter being configured to modulate a digital symbol stream onto two polarization components of an optical carrier generated by the laser in a manner that pre-compensates some intra-channel nonlinear optical distortions produced by transmission of a resulting modulated optical carrier over an optical fiber; and wherein the digital signal processor is electrically connected to control the associated electrical drivers and comprises a digital circuit configured to estimate intra-channel nonlinear optical distortions during the transmission of the modulated optical carrier in a polarization-mode-dispersion dependent manner that gives a lower weight to some contributions to the intra-channel nonlinear optical distortions caused by interactions between frequency components of the modulated optical carrier of larger intra-channel frequency difference than to other contributions to the intra-channel nonlinear optical distortions caused by interactions between frequency components of the modulated optical carrier of smaller intra-channel frequency difference.

According to yet another example embodiment, provided is an apparatus comprising: an optical front-end circuit configured to receive an optical communication signal; and a digital signal processor operatively connected to the optical front-end circuit and configured to generate an estimate of nonlinear interference noise for two orthogonal polarizations of the optical communication signal, the estimate being generated using two or more different approximations of an effect of polarization mode dispersion on the nonlinear interference noise within a bandwidth of the optical communication signal.

According to yet another example embodiment, provided is an apparatus comprising: an optical front-end circuit configured to transmit an optical communication signal; and a digital signal processor operatively connected to the optical front-end circuit and configured to generate an estimate of nonlinear interference noise for two orthogonal polarizations of the optical communication signal, the estimate being generated using two or more different approximations of an effect of polarization mode dispersion on the nonlinear interference noise within a bandwidth of the optical communication signal.

BRIEF DESCRIPTION OF THE DRAWINGS

Other aspects, features, and benefits of various disclosed embodiments will become more fully apparent, by way of example, from the following detailed description and the accompanying drawings, in which:

FIG. 6 shows a block diagram of an NLIN estimator that can be used in the NLIN-compensation module of FIG. 5 according to an embodiment; and FIGS. 7A-7B show flowcharts of signal processing methods that can be used to implement the NLIN-compensation module of FIG. 5 according to an embodiment.

DETAILED DESCRIPTION

Figure 1:
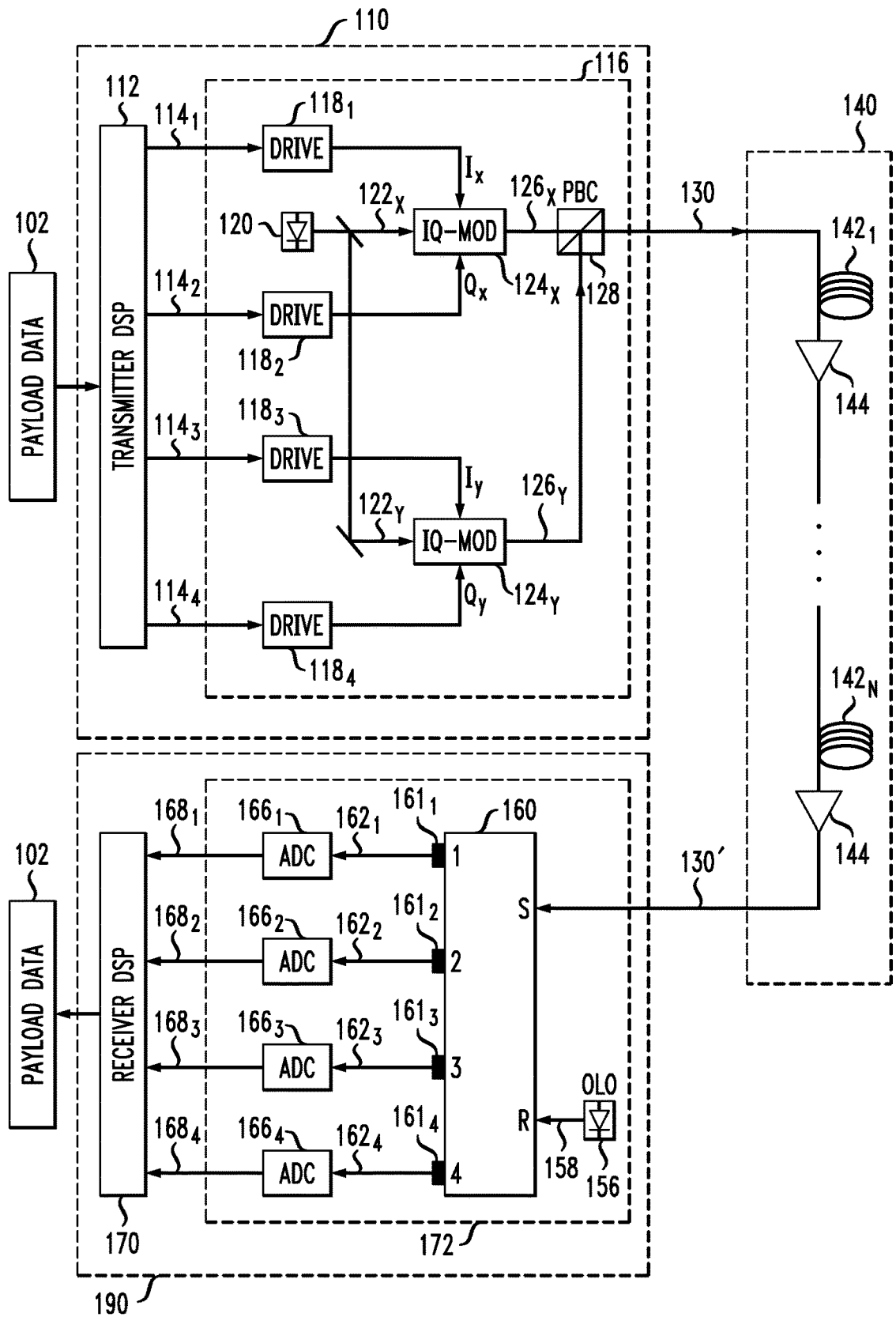
FIG. 1 shows a block diagram of an optical transport system according to an embodiment.

FIG. 1 shows a block diagram of an optical transport system 100 according to an embodiment. System 100 has an optical transmitter 110 and a coherent optical receiver 190 connected by way of an optical transport link 140. In an example embodiment, optical transport link 140 can be implemented using one or more sections 142 of optical fiber or fiber-optic cable. For illustration purposes and without any implied limitations, optical transport link 140 is shown as (i) having N sections 142 that are labeled in FIG. 1 as $142_1$-$142_N$ and (ii) being an amplified optical link having a plurality of optical amplifiers 144 located between adjacent sections 142 and configured to amplify the optical signals that are being transported through the optical transport link, e.g., to counteract signal attenuation. In an alternative embodiment, optical transport link 140 that has only one or even no optical amplifiers 144 can similarly be used. In some embodiments, optical transport link 140 may also include one or more inline dispersion-compensation modules (e.g., dispersion-compensating fiber (DCF)).

In operation, transmitter 110 receives a digital electrical input stream 102 of payload data and applies it to a digital signal processor (DSP) 112. DSP 112 processes input data stream 102 to generate digital signals $114_1$-$114_4$. In an example embodiment, DSP 112 may perform, inter alia, one or more of the following: (i) de-multiplex input stream 102 into two sub-streams, each intended for optical transmission using a respective one of orthogonal (e.g., X and Y) polarizations of an optical output signal 130; (ii) encode each of the sub-streams using a suitable code, e.g., to prevent error propagation and enable error correction at receiver 190; (iii) convert each of the two resulting sub-streams into a corresponding sequence of constellation symbols; and (iv) perform digital signal pre-distortion, e.g., to mitigate the adverse effects imposed by an electrical-to-optical (E/O) converter (also sometimes referred to as a front-end circuit) 116 of transmitter 110, optical transport link 140, and/or a front-end circuit 172 of receiver 190. In each signaling interval (also referred to as a symbol period or time slot), signals $114_1$ and $114_2$ carry digital values that represent the in-phase (I) component and quadrature (Q) component, respectively, of a corresponding (possibly pre-distorted) constellation symbol intended for transmission using a first (e.g., X) polarization of light. Signals $114_3$ and $114_4$ similarly carry digital values that represent the I and Q components, respectively, of the corresponding (possibly pre-distorted) constellation symbol intended for transmission using a second (e.g., Y) polarization of light.

E/O converter 116 operates to transform digital signals $114_1$-$114_4$ into a corresponding modulated optical output signal 130. More specifically, drive circuits $118_1$ and $118_2$ transform digital signals $114_1$ and $114_2$, as known in the art, into electrical analog drive signals $I_X$ and $Q_X$, respectively. Drive signals $I_X$ and $Q_X$ are then used, in a conventional manner, to drive an I-Q modulator $124_X$. In response to drive signals $I_X$ and $Q_X$, I-Q modulator $124_X$ operates to modulate an X-polarized beam $122_X$ of light supplied by a laser source 120 as indicated in FIG. 1, thereby generating a modulated optical signal $126_X$.

Drive circuits $118_3$ and $118_4$ similarly transform digital signals $114_3$ and $114_4$ into electrical analog drive signals $I_Y$ and $Q_Y$, respectively. In response to drive signals $I_Y$ and $Q_Y$, an I-Q modulator $124_Y$ operates to modulate a Y-polarized beam $122_Y$ of light supplied by laser source 120 as indicated in FIG. 1, thereby generating a modulated optical signal $126_Y$. A polarization beam combiner 128 operates to combine modulated optical signals $126_X$ and $126_Y$, thereby generating optical output signal 130, this optical output signal being a polarization-division-multiplexed (PDM) signal. Optical output signal 130 is then applied to optical transport link 140.

After propagating through optical transport link 140, optical signal 130 becomes optical signal 130', which is applied to receiver 190. Optical signal 130' may differ from optical signal 130 because optical transport link 140 typically adds noise and imposes various linear and nonlinear signal distortions, such as those caused by the above-mentioned Kerr effect, CD, PMD, SPM, XPM, and FWM.

Front-end circuit 172 of receiver 190 comprises an optical hybrid 160, light detectors $161_1$-$161_4$, analog-to-digital converters (ADCs) $166_1$-$166_4$, and an optical local-oscillator (OLO) source 156. Optical hybrid 160 has (i) two input ports labeled S and R and (ii) four output ports labeled 1 through 4. Input port S receives optical signal 130' from optical transport link 140. Input port R receives an OLO signal 158 generated by OLO source 156. OLO signal 158 has an optical-carrier wavelength (frequency) that is sufficiently close to that of signal 130' to enable coherent (e.g., intradyne) detection of the latter signal. OLO signal 158 can be generated, e.g., using a relatively stable tunable laser whose output wavelength (frequency) is approximately the same as the carrier wavelength (frequency) of optical signal 130.

In an example embodiment, optical hybrid 160 operates to mix input signal 130' and OLO signal 158 to generate different mixed (e.g., by interference) optical signals (not explicitly shown in FIG. 1). Light detectors $161_1$-$161_4$ then convert the mixed optical signals into four electrical signals $162_1$-$162_4$ that are indicative of complex values corresponding to two orthogonal-polarization components of signal 130'. For example, electrical signals $162_1$ and $162_2$ may be an analog I signal and an analog Q signal, respectively, corresponding to a first (e.g., horizontal, h) polarization component of signal 130'. Electrical signals $162_3$ and $162_4$ may similarly be an analog I signal and an analog Q signal, respectively, corresponding to a second (e.g., vertical, v) polarization component of signal 130'. Note that the orientation of the h and v polarization axes at receiver 190 may not coincide with the orientation of the X and Y polarization axes at transmitter 110.

Each of electrical signals $162_1$-$162_4$ is converted into digital form in a corresponding one of ADCs $166_1$-$166_4$. Optionally, each of electrical signals $162_1$-$162_4$ may be amplified in a corresponding electrical amplifier (not explicitly shown) prior to the resulting signal being converted into digital form. Digital signals $168_1$-$168_4$ produced by ADCs $166_1$-$166_4$ are then processed by a DSP 170 to recover the data of the original input data stream 102 applied to transmitter 110. In an example embodiment, DSP 170 may perform, inter alia, one or more of the following: (i) signal processing directed at dispersion compensation; (ii) signal processing directed at compensation of nonlinear distortions; (iii) electronic polarization de-multiplexing; and (iv) error correction based on the data encoding applied at DSP 112. Example embodiments of DSP 170 are described in more detail below in reference to FIGS. 2-3.

In some embodiments, at least some of the signal processing directed at dispersion compensation and/or compensation of nonlinear distortions can be performed at DSP 112 instead of being performed at DSP 170. In this case, this signal processing can be used to pre-distort optical output signal 130 in a manner that causes optical signal 130' to be less distorted than in the absence of this pre-distortion.

Figure 2:
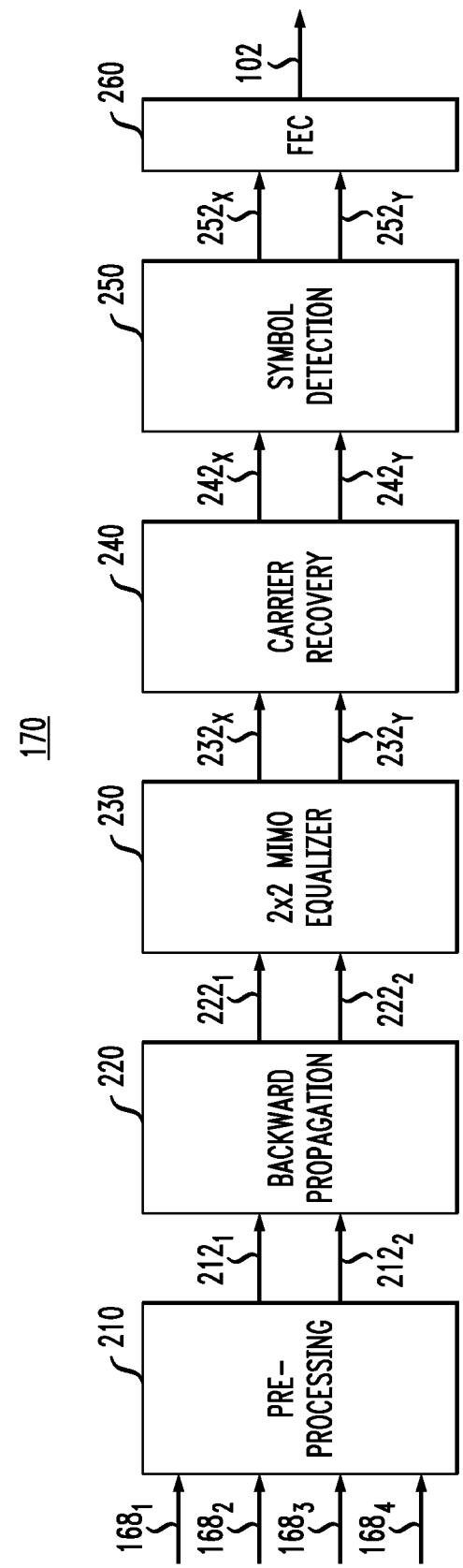
FIG. 2 shows a block diagram of a DSP that can be used in the optical transport system of FIG. 1 according to an embodiment.

FIG. 2 shows a block diagram of DSP 170 (FIG. 1) according to an embodiment. Digital signals $168_1$-$168_4$ and output data stream 102 are also shown in FIG. 2 to better illustrate the relationship between the circuits shown in FIGS. 1 and 2.

Ideally, digital signals $168_1$ and $168_2$ represent the I and Q components, respectively, of the horizontal polarization component of optical signal 130', and digital signals $168_3$ and $168_4$ represent the I and Q components, respectively, of the vertical polarization component of that optical signal. However, various transmission impairments, front-end implementation imperfections, and configuration inaccuracies generally cause each of digital signals $168_1$-$168_4$ to be a convoluted signal that has various linear and nonlinear distortions and/or contributions from different signal components originally generated at transmitter 110 (FIG. 1). The train of signal processing implemented in DSP 170 is generally directed at reducing the adverse effects of the signal distortions and de-convolving digital signals $168_1$-$168_4$ so that the transmitted data can be properly recovered to generate output data stream 102 with an acceptably low BER.

In an example embodiment, DSP 170 comprises a signal-pre-processing module 210 configured to receive digital signals $168_1$-$168_4$. One of the functions of module 210 may be to adapt the signal samples received via digital signals $168_1$-$168_4$ to a form that is more suitable for the signal-processing algorithms implemented in the downstream modules of DSP 170. For example, module 210 may be configured to (i) resample digital signals $168_1$-$168_4$ such that each of these signals carries two samples per symbol period and/or (ii) convert real-valued signal samples into the corresponding complex-valued signal samples. The resulting complex-valued digital signals generated by signal-pre-processing module 210 are labeled $212_1$-$212_2$.

DSP 170 further comprises a backward-propagation (BP) module 220 that converts digital signals $212_1$ and $212_2$ into digital signals $222_1$ and $222_2$, respectively. In an example embodiment, BP module 220 implements signal processing directed at causing digital signals $222_1$ and $222_2$ to provide a good approximation of the undistorted optical signal 130 applied by transmitter 110 to optical transport link 140 (see FIG. 1). In particular, BP module 220 operates to (i) carry out dispersion-compensation processing and (ii) at least partially remove nonlinear-interference (NLI) noise from digital signals $222_1$ and $222_2$. Example embodiments of BP module 220 are described in more detail below in reference to FIGS. 3-7.

Digital signals $222_1$ and $222_2$ are applied to a 2×2 MIMO (multiple-input/multiple-output) equalizer 230 for MIMO-equalization processing therein, and the resulting equalized signals are complex-valued digital signals $232_X$ and $232_Y$. In an example embodiment, equalizer 230 can be a butterfly equalizer configured to perform electronic polarization demultiplexing and reduce some effects of inter-symbol interference. Example 2×2 MIMO equalizers that can be used to implement equalizer 230 are disclosed, e.g., in U.S. Pat. No. 9,020,364 and U.S. Patent Application Publication No. 2015/0372764, both of which are incorporated herein by reference in their entirety.

Digital signals $232_X$ and $232_Y$ generated by equalizer 230 are applied to a carrier-recovery module 240 that is configured to perform signal processing generally directed at (i) compensating the frequency mismatch between the carrier frequencies of OLO signal 158 and optical input signal 130' and/or (ii) reducing the effects of phase noise. Various signal-processing techniques that can be used to implement the corresponding signal processing in carrier-recovery module 240 are disclosed, e.g., in U.S. Pat. Nos. 7,747,177, 8,073,345, and 9,112,614, all of which are incorporated herein by reference in their entirety.

Digital signals $242_X$ and $242_Y$ generated by carrier-recovery module 240 are applied to a symbol-detection module 250. In an example embodiment, symbol-detection module 250 is configured to use the complex values conveyed by digital signals $242_X$ and $242_Y$ to appropriately map each complex value onto an operative constellation to determine the corresponding received symbol and, based on this mapping, determine the corresponding bit-word encoded by the symbol. Symbol-detection module 250 then concatenates the determined bit-words to generate data streams $252_X$ and $252_Y$.

In some embodiments, data streams $252_X$ and $252_Y$ can be applied to an optional forward-error-correction (FEC) decoder 260 configured to perform digital signal processing that implements error correction based on data redundancies (if any) in optical signal 130. FEC decoder 260 appropriately multiplexes the resulting error-corrected data streams to generate output data stream 102.

In some embodiments, the use of symbol-detection module 250 configured to determine the likelihood of the corresponding received symbol can alternatively be used, e.g., in embodiments employing soft FEC.

Figure 3:
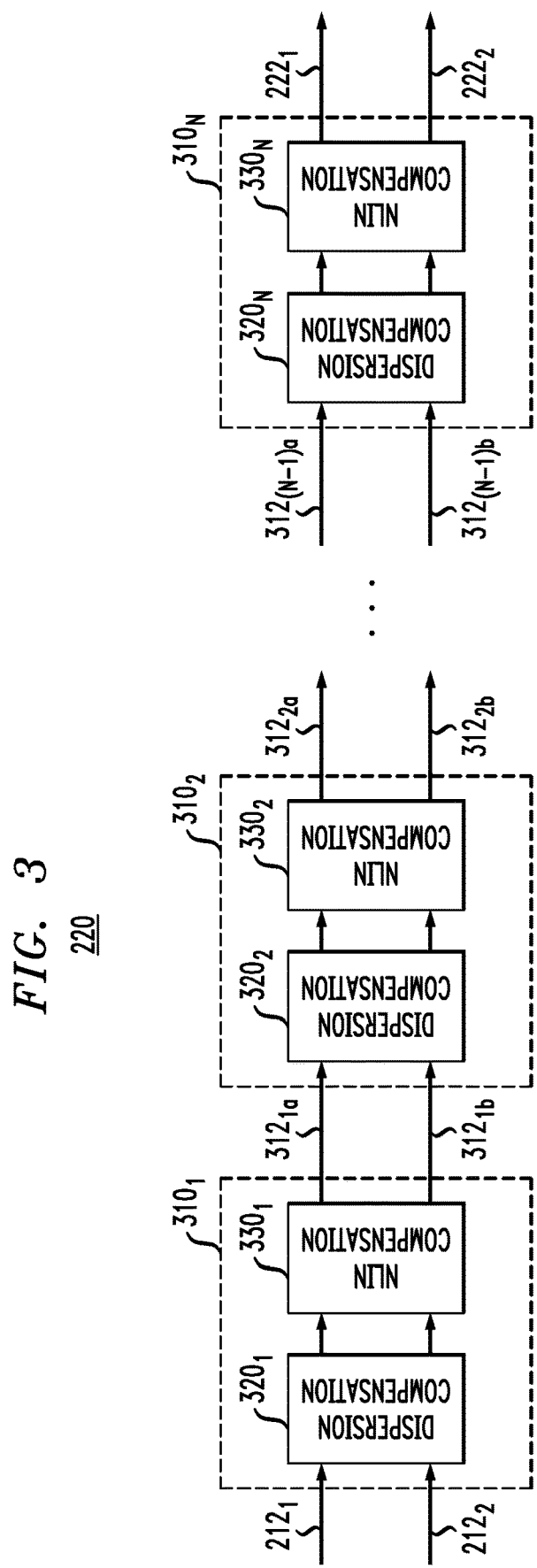
FIG. 3 shows a block diagram of a backward-propagation module that can be used in the DSP of FIG. 2 according to an embodiment.

FIG. 3 shows a block diagram of BP module 220 (FIG. 2) according to an embodiment. Digital signals $212_1$-$212_2$ and $222_1$-$222_2$ are also shown in FIG. 3 to better illustrate the relationship between the circuits shown in FIGS. 2 and 3.

BP module 220 comprises N processing stages labeled $310_1$-$310_N$, where N is a positive integer. In operation, each of processing stages $310_1$-$310_N$ is configured to carry out dispersion compensation and NLI-noise (NLIN) reduction corresponding to a respective section 142 of link 140. In the embodiment shown in FIG. 3, the number N is at least three (i.e., N≥3). However, alternative embodiments in which N=1 or N=2 are also possible.

A processing stage $310_i$ comprises a dispersion-compensation module $320_i$ and an NLIN-compensation module $330_i$, where i=1, 2, . . . , N. Dispersion-compensation module $320_1$ is configured to receive digital signals $212_1$-$212_2$. NLIN-compensation module $330_N$ is configured to output digital signals $222_1$-$222_2$. NLIN-compensation module $330_j$ (where j=1, 2, . . . , N−1) is configured to output digital signals $312_{ja}$-$312_{jb}$, which are then applied to dispersion-compensation module $320_{j+1}$. The resulting dispersion-compensated signals generated by dispersion-compensation module $320_{j+1}$ are applied to NLIN-compensation module $330_{j+1}$.

Example digital circuits that can be used to implement dispersion-compensation module $320_i$ are disclosed, e.g., in U.S. Pat. Nos. 8,260,154, 7,636,525, 7,266,310, all of which are incorporated herein by reference in their entirety.

In operation, NLIN-compensation module $330_i$ uses a BP algorithm that carries out frequency-domain perturbation-based digital backward propagation configured to at least partially remove NLI noise from the corresponding signals. In an example embodiment, the used BP algorithm represents a modified version of Volterra-series digital backward propagation, with some of the modifications being directed at (at least) partially accounting for the influence of PMD on NLI noise in link 140. The theoretical basis of the BP algorithm used in NLIN-compensation module $330_i$ is described in more detail below in reference to Eqs. (1)-(11). An example signal-processing method that can be used to implement this BP algorithm in NLIN-compensation module $330_i$ is shown in and described in reference to FIG. 7. Example digital circuits that can be used in NLIN-compensation module 330; for this purpose are shown in and described in reference to FIGS. 5-6.

In some embodiments, the positions of dispersion-compensation module $320_i$ and NLIN-compensation module 330; may be swapped in each or some of processing stages $310_i$. In such embodiments, dispersion-compensation module $320_i$ is located after (downstream from) NLIN-compensation module $330_i$.

PMD can affect the way in which nonlinearities accumulate during the forward propagation of optical signal 130 through link 140. For example, PMD can induce frequency-dependent polarization rotations onto optical signal 130 that evolve stochastically during the forward propagation through link 140. The exact evolution of these polarization rotations along link 140 is typically unknown due to the stochastic nature thereof.

Conventional digital BP algorithms typically ignore the effects of PMD on NLI noise, thereby disadvantageously impairing the accuracy of the algorithm and/or limiting the achievable BP-equalizer gain.

These and some other related problems in the state of the art can be addressed, e.g., using embodiments of the BP algorithm in which at least some effects of PMD on NLI noise are accounted for using the signal processing implemented in BP module 220. Experiments and computer simulations indicate that BP module 220 configured in this manner beneficially enables DSP 170 to provide an additional signal-to-noise-ratio (SNR) gain of up to ~2.5 dB compared to a configuration of the same DSP in which one or more NLIN-compensation modules 330 are disabled or removed from the corresponding chain of signal processing. In some embodiments, the obtained SNR gain can be significantly higher than that provided by a comparable conventional digital BP algorithm in which the effects of PMD on NLI noise are ignored.

In the presence of amplified-spontaneous-emission (ASE) noise, a spectral component $r(\omega)$ that represents the optical signal at the output of a corresponding fiber section can be expressed using Eq. (1):

$$r(\omega) = J(\omega, L)(a(\omega) + \Delta a(\omega)) + Z(\omega) \qquad (1)$$

where $\omega$ is the angular frequency; $Z(\omega)$ is the ASE noise at the angular frequency co accumulated in the corresponding fiber section; $J(\omega, L)$ is a 2×2 matrix that describes the accumulated polarization rotation at angular frequency $\omega$ and distance L; $a(\omega)$ and $\Delta a(\omega)$ are the two-component column vectors that represent the optical signal at the input of the corresponding fiber section and the NLI noise accumulated in the fiber section, respectively, in the two polarizations of the optical signal.

Based on the first-order perturbation analysis, the accumulated NLI noise $\Delta a(\omega)$ can be expressed as follows:

$$\Delta a(\omega) = \iint \psi(\omega_1, \omega_2, \omega_3) d\omega_1 d\omega_2 \qquad (2)$$

where $\omega_3 = \omega - \omega_1 + \omega_2$; and the function $\psi(\omega_1, \omega_2, \omega_3)$ describes the FWM processes that nonlinearly couple the spectral components $a(\omega_1)$, $a(\omega_2)$, and $a(\omega_3)$. For a fiber section of length L, the function $\psi(\omega_1, \omega_2, \omega_3)$ can be expressed as follows:

$$\psi(\omega_1,\omega_2,\omega_3) = \int_0^L \rho(\omega_1,\omega_2,\omega_3,z) J(\omega,z)^H J(\omega_3,z) a(\omega_3) a \\ (\omega_2)^H J(\omega_2,z)^H J(\omega_1,z) a(\omega_1) dz \qquad (3)$$

where $J(\omega,z)$ is a 2×2 matrix that describes the accumulated polarization rotation at angular frequency $\omega$ and distance z; H denotes the conjugate transpose; and the function $\rho$ is expressed as follows:

$$\rho(\omega_1, \omega_2, \omega_3, z) = \frac{8}{9} j\gamma f(z) \exp(j\beta_2(\omega_3 - \omega_2)(\omega_2 - \omega_1)z) \qquad (4)$$

where $f(z)$, $\gamma$, and $\beta_2$ represent the power profile of the optical signal in the fiber, the nonlinear coefficient of the fiber, and the dispersion coefficient of the fiber, respectively.

When the effects of PMD on NLI noise can be neglected, each of the terms $J(\omega,z)^H J(\omega_3,z)$ and $J(\omega_2,z)^H J(\omega_1,z)$ in Eq. (3) can be replaced by the identity matrix, which removes the PMD dependence from the corresponding FWM terms in Eqs. (2)-(3).

When the effects of PMD on NLI noise need to be taken into account, it is useful to note that the polarization-rotation matrices $J(\omega, z)$ at frequencies co and $\omega+\Delta\omega$ tend to lose mutual coherence at sufficiently large values of $\Delta\omega$. In this case, the terms $J(\omega,z)^H J(\omega_3,z)$ and $J(\omega_2,z)^H J(\omega_1,z)$ in Eq. (3) differ from the identity matrix, which causes the corresponding FWM terms in Eqs. (1)-(3) to depend on the (unknown) PMD evolution along the length of the fiber.

From an algorithmic perspective, one can approximate the above-described behavior of the polarization-rotation matrices $J(\omega, z)$ using a step-like autocorrelation function according to which: (i) the matrices $J(\omega, z)$ and $J(\omega+\Delta\omega, z)$ are statistically independent if $|\Delta\omega| > \Delta\omega_0$, where $\Delta\omega_0$ is a fixed threshold value that can be one of the parameters of the corresponding algorithm; and (ii) the matrices $J(\omega, z)$ and $J(\omega+\Delta\omega, z)$ are identical, i.e., $J(\omega, z) = J(\omega+\Delta\omega, z)$, if $|\Delta\omega| \leq \Delta\omega_0$. Based on this autocorrelation function, the function $\psi(\omega_1,\omega_2,\omega_3)$ can be expressed using three different approximations, the use of which depends on the relationship between the frequencies $\omega$, $\omega_1$, $\omega_2$, and $\omega_3$. The following three sets of inequalities can be used to define three respective spectral regions in a multidimensional frequency space representing the signal bandwidth, in which the three approximations can be applied:

(A) $|\omega_1 - \omega_2| = |\omega_3 - \omega| \leq \Delta\omega_0$;

(B) $|(\omega_1 - \omega_2)| = |\omega_3 - \omega| > \Delta\omega_0$ and $|\omega_1 - \omega| = |(\omega_2 - \omega_3| \leq \Delta\omega_0$; and (C) all other $\omega$, $\omega_1$, $\omega_2$, and $\omega_3$ that do not satisfy (A) or (B).

A person of ordinary skill in the art will understand that a similar analysis can be performed for any suitable autocorrelation function, including more complex auto-correlation functions constructed to more accurately represent the spectral characteristics of PMD.

Figure 4:
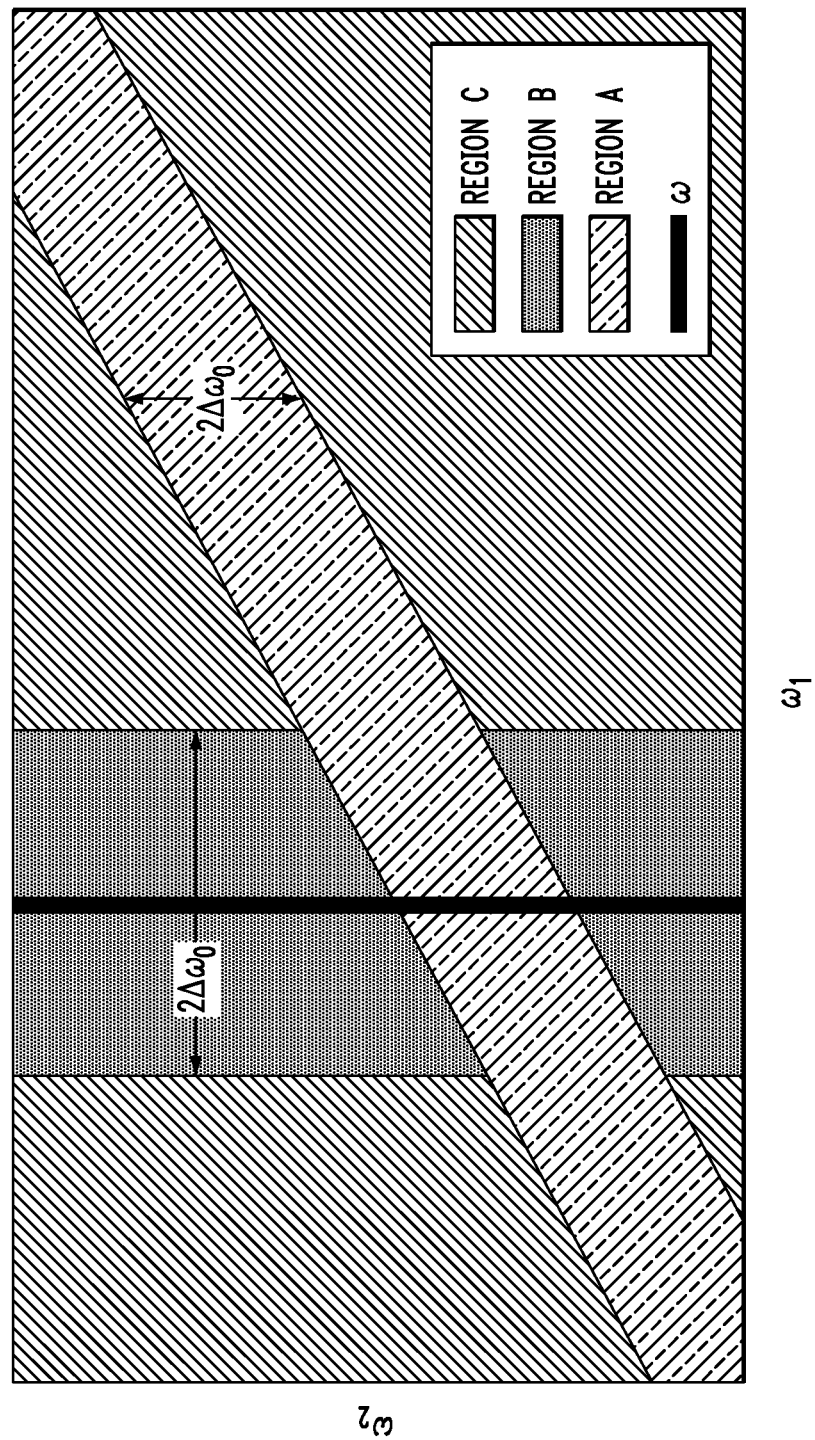
FIG. 4 graphically shows different spectral regions in which different approximations of the effect of PMD on nonlinear interference noise (NLIN) can be used according to an embodiment.

FIG. 4 graphically shows spectral regions A-C for a fixed frequency co according to an embodiment. The spectral regions A-C shown in FIG. 4 correspond to the above-shown sets of inequalities (A)-(C), respectively, and are parts of a multidimensional frequency space representing the bandwidth of optical signal 130.

In the spectral region A, Eq. (3) can be approximated using Eq. (5):

$$\psi(\omega_1,\omega_2,\omega_3) = \int_0^L \rho(\omega_1,\omega_2,\omega_3,z) a(\omega_3) a(\omega_2)^H a(\omega_1) dz \quad (5)$$

In Eq. (5) the terms containing matrices $J(\omega, z)$ are replaced by identity matrices. As a result, the corresponding approximations of the function $\psi(\omega_1,\omega_2,\omega_3)$ and NLI noise do not depend on PMD.

In the spectral region B, Eq. (3) can be approximated using Eq. (6):

$$\psi(\omega_1, \omega_2, \omega_3) = \frac{1}{2}\int_0^L \rho(\omega_1, \omega_2, \omega_3, z) a(\omega_1) a(\omega_2)^H a(\omega_3) dz \quad (6)$$

Compared to Eq. (5), the spectral components $a(\omega_1)$ and $a(\omega_3)$ are interchanged in Eq. (6), and the magnitude of the function $\psi(\omega_1,\omega_2,\omega_3)$ is smaller by a factor of ½. As a result, Eq. (6) approximately takes into account the statistical average of the terms containing matrices $J(\omega, z)$ for configurations in which the NLI noise is somewhat sensitive to PMD. This sensitivity is such that it causes the statistical average of the terms containing matrices $J(\omega, z)$ to differ from zero in a non-negligible manner.

In the spectral region C, Eq. (3) can be approximated using Eq. (7):

$$\psi(\omega_1,\omega_2,\omega_3) = 0 \quad (7)$$

In this spectral region, NLI noise is significantly more sensitive to PMD than in the spectral region B, which causes the statistical average of the terms containing matrices $J(\omega, z)$ to be sufficiently close to zero to make the approximation expressed by Eq. (7) sufficiently accurate.

Figure 5:
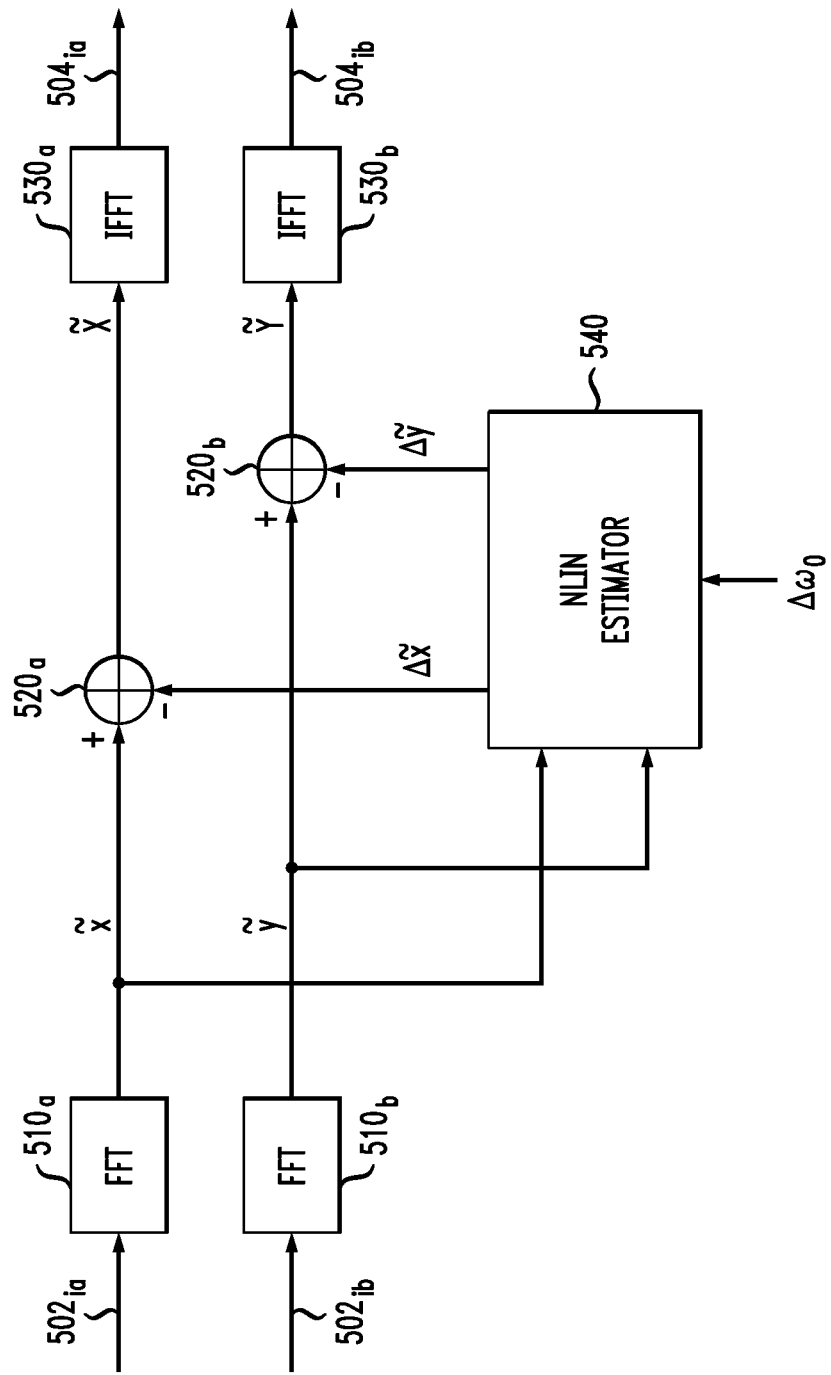
FIG. 5 shows a block diagram of an NLIN-compensation module that can be used in the backward-propagation module of FIG. 3 according to an embodiment.

FIG. 5 shows a block diagram of NLIN-compensation module $330_i$ (FIG. 3) according to an embodiment. Digital input signals $502_{ia}$ and $502_{ib}$ applied to NLIN-compensation module $330_i$ are generated by dispersion-compensation module $320_i$ (also see FIG. 3). For $i=1, 2, \ldots, N-1$, digital output signals $504_{ia}$ and $504_{ib}$ generated by NLIN-compensation module $330_i$ are signals $312_{ia}$ and $312_{ib}$, respectively (see FIG. 3). For $i=N$, digital output signals $504_{ia}$ and $504_{ib}$ generated by NLIN-compensation module $330_i$ are signals $222_1$ and $222_2$, respectively (see FIGS. 2-3).

In operation, NLIN-compensation module $330_i$ carries out calculations that are based on discrete versions of Eqs. (1)-(7), e.g., as further explained below. An example embodiment of an NLIN estimator 540 used in NLIN-compensation module $330_i$ is described in more detail below in reference to FIG. 6.

Digital signals $502_{ia}$ and $504_{ia}$ correspond to the first (e.g., horizontal) polarization of optical signal 130'. A fast-Fourier-transform (FFT) module $510_a$ operates to transform a sequence of time-domain samples supplied by digital signal $502_{ia}$ into a corresponding set of frequency components $\tilde{x}^{(n)}$, where the index n represents the frequency.

Digital signals $502_{ib}$ and $504_{ib}$ correspond to the second (e.g., vertical) polarization of optical signal 130'. An FFT module $510_b$ operates to transform a sequence of time-domain samples supplied by digital signal $502_{ib}$ into a corresponding set of frequency components $\tilde{y}^{(n)}$.

Using the sets $\{\tilde{x}^{(n)}\}$ and $\{\tilde{y}^{(n)}\}$ generated by FFT modules $510_a$ and $510_b$, NLIN estimator 540 computes estimates $\Delta\tilde{x}^{(n)}$ and $\Delta\tilde{y}^{(n)}$ of NLI noise for the two polarizations. These computations take into account the effects of PMD on NLI noise in accordance with Eqs. (2)-(7). Accordingly, NLIN estimator 540 is configured to use a fixed threshold value $\Delta\omega_0$ to delineate the spectral regions A-C graphically illustrated in FIG. 4.

In an example embodiment, the computations performed by NLIN estimator 540 can be based on the following mathematical expressions:

$$\begin{pmatrix} \Delta\tilde{x}^{(n)} \\ \Delta\tilde{y}^{(n)} \end{pmatrix} = \sum_h \sum_k \sum_m \tilde{\rho}_{h-n,k-n,m-n} \begin{pmatrix} \tilde{x}^{(h)} \\ \tilde{y}^{(h)} \end{pmatrix} \begin{pmatrix} \tilde{x}^{(k)} \\ \tilde{y}^{(k)} \end{pmatrix}^H \begin{pmatrix} \tilde{x}^{(m)} \\ \tilde{y}^{(m)} \end{pmatrix} \quad (8)$$

$$\tilde{\rho}_{h,k,m} = \rho_{h,k,m}, \text{ if } |h-k| \le \Delta\omega_0 \text{ and } |m-k| \le \Delta\omega_0 \quad (9a)$$

$$\tilde{\rho}_{h,k,m} = \rho_{h,k,m} + 0.5\rho_{m,k,h}, \text{ if } |m-k| \le \Delta\omega_0 \text{ and } |h-k| > \Delta\omega_0 \quad (9b)$$

$$\tilde{\rho}_{h,k,m} = 0, \text{ for all other combinations of } h, k, \text{ and } m \quad (9c)$$

Eq. (8) represents a discrete version of Eqs. (2)-(4). Eqs. (9a)-(9c) represent discrete versions of Eqs. (5)-(7), respectively, adapted for an example embodiment of NLIN estimator 540.

An adder $520_a$ operates to generate a set of corrected frequency components $\tilde{X}^{(n)}$ by subtracting the estimates $\Delta\tilde{x}^{(n)}$ from the corresponding frequency components $\tilde{x}^{(n)}$. An adder $520_b$ similarly operates to generate a set of corrected frequency components $\tilde{Y}^{(n)}$ by subtracting the estimates $\Delta\tilde{y}^{(n)}$ from the corresponding frequency components $\tilde{y}^{(n)}$. Mathematical expressions of the corresponding operations are given by Eqs. (10a)-(10b):

$$\tilde{X}^{(n)} = \tilde{x}^{(n)} - \Delta\tilde{x}^{(n)} \quad (10a)$$

$$\tilde{Y}^{(n)} = \tilde{y}^{(n)} - \Delta\tilde{y}^{(n)} \quad (10b)$$

An inverse FFT (IFFT) module $530_a$ operates to transform the set $\{\tilde{X}^{(n)}\}$ received from adder $520_a$ into a corresponding sequence of corrected time-domain samples and outputs the latter by way of digital signal $504_{ia}$. An IFFT module $530_b$ similarly operates to transform the set $\{\tilde{Y}^{(n)}\}$ received from adder $520_b$ into a corresponding sequence of corrected time-domain samples and outputs the latter by way of digital signal $504_{ib}$.

FIG. 6 shows a block diagram of NLIN estimator 540 according to an example embodiment. As shown, NLIN estimator 540 includes a triplet generator 610, an array 620 of multipliers 622, a memory 630, and a sum generator 640 interconnected as indicated in FIG. 6.

Memory 630 has stored therein the values of $\tilde{\rho}_{h,k,m}$ for all possible combinations of the frequency indices h, k, and m, for a total of $M^3$ values, where M is the size of the sets $\{\tilde{x}^{(n)}\}$ and $\{\tilde{y}^{(n)}\}$. The values of $\tilde{\rho}_{h,k,m}$ can be calculated and saved in memory 630 during the initial configuration setup of NLIN estimator 540, e.g., using the selected value of the threshold $\Delta\omega_0$ and Eqs. (9a)-(9c).

Triplet generator 610 is configured to compute $M^3$ different triplets (h, k, m) using the following expression:

$$\begin{pmatrix} \tilde{x}^{(h)} \\ \tilde{y}^{(h)} \end{pmatrix} \begin{pmatrix} \tilde{x}^{(k)} \\ \tilde{y}^{(k)} \end{pmatrix}^H \begin{pmatrix} \tilde{x}^{(m)} \\ \tilde{y}^{(m)} \end{pmatrix} \quad (11)$$

where $h=1, 2, \ldots, M$; $k=1, 2, \ldots, M$; and $m=1, 2, \ldots, M$.

Array 620 and sum generator 640 are configured to use the $M^3$ different triplets (h, k, m) received from triplet generator 610 and the corresponding values of $\tilde{\rho}_{h,k,m}$ retrieved from memory 630 to compute the estimates $\Delta\tilde{x}^{(n)}$ and $\Delta\tilde{y}^{(n)}$ in accordance with Eq. (8). More specifically, each of multipliers 622 is configured to generate a product of the respective triplet and the corresponding value of $\tilde{\rho}_{h-n,k-n,m-n}$. In an example embodiment, the latter values can be obtained using the values of $\tilde{\rho}_{h,k,m}$ stored in memory 630 and one or more conventional shift registers (not explicitly shown in FIG. 6) configured to apply a shift corresponding to different values of n. The products obtained in this manner are summed by sum generator 640 to generate the estimates $\Delta\tilde{x}^{(n)}$ and $\Delta\tilde{y}^{(n)}$.

Figure 7A:
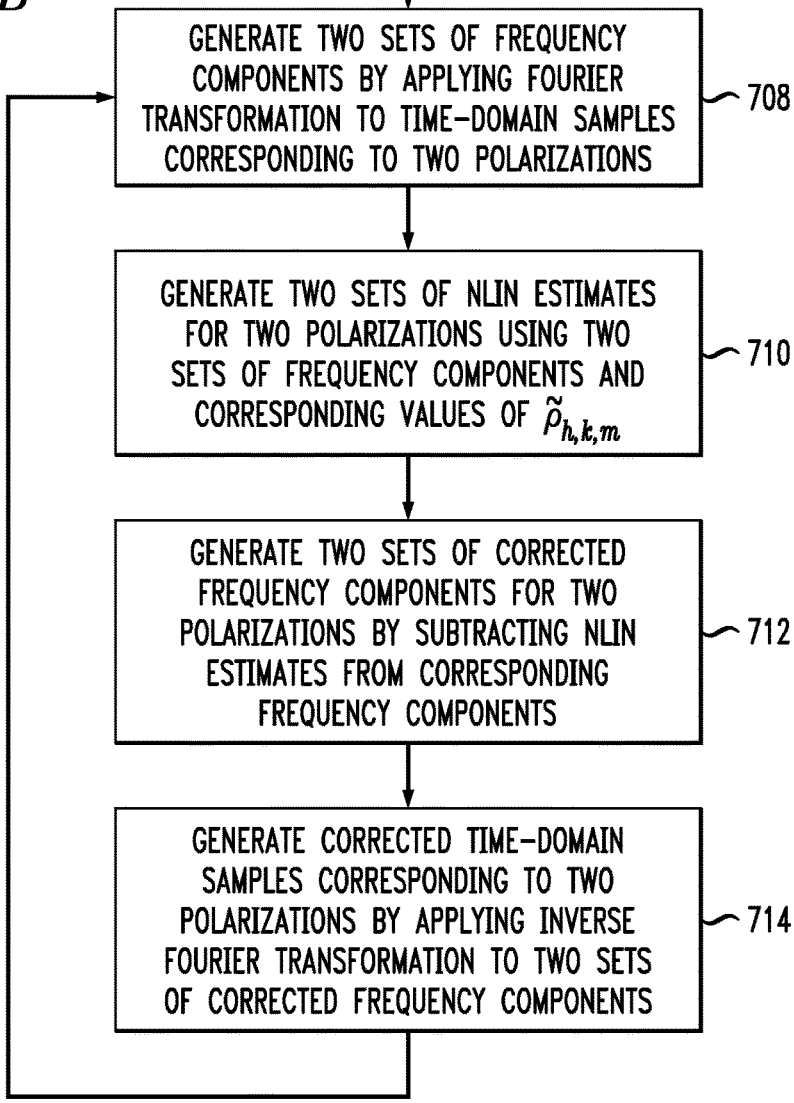

FIGS. 7A-7B show flowcharts of signal processing methods 700 and 720, respectively, each of which can be used to implement NLIN-compensation module 330$_i$ according to an embodiment. Steps 702-706 of method 700 can be performed, e.g., at the factory, during the initial configuration setup of NLIN-compensation module 330$_i$. Steps 708-714 of method 720 can be executed, e.g., after the deployment in the field, during the subsequent transmission of payload data 102 in system 100. In some embodiments, methods 700 and 720 can be executed by different entities, e.g., the equipment manufacturer/installer and the operator of the corresponding optical transport system, respectively. In some embodiments, methods 700 and 720 can be executed by the same entity, e.g., the installer/operator of the corresponding optical transport system and, as such, can be combined into a single method by an optional logical link between steps 706 and 708 shown by the dashed arrow.

At step 702 of method 700 (FIG. 7A), the pertinent parameters of the corresponding fiber-optic section 142 may be entered into the configuration file(s) of NLIN-compensation module 330$_i$. Such parameters may include but are not limited to: (i) the length L of the optical fiber used in the corresponding fiber-optic section; (ii) the optical input power; (iii) the power profile f(z) of the optical signal along the fiber; (iv) the nonlinear coefficient γ of the fiber; and (v) the dispersion coefficient $\beta_2$ of the fiber (also see Eq. (4)).

At step 704, the value of the threshold $\Delta\omega_0$ is selected and saved in the configuration file(s). In an example embodiment, the value of $\Delta\omega_0$ can be selected using an iterative optimization procedure during which the BP-processing gain is evaluated for different values of $\Delta\omega_0$ based on (i) the signal bandwidth and (ii) the link parameters specified at step 702. A value of $\Delta\omega_0$ that provides an acceptable (e.g., relatively high) BP-processing gain may then be selected for the subsequent use at step 706.

At step 706, the values of $\tilde{\rho}_{h,k,m}$ corresponding to different sets of the indices h, k, and m are computed using Eqs. (9a)-(9c) and saved, e.g., in memory 630 (FIG. 6). The number of non-zero values of $\tilde{\rho}_{h,k,m}$ depends, inter alia, on the value of $\Delta\omega_0$ selected at step 704 and the number M of digital samples used in the FFT operations carried out by FFT modules 510$_a$ and 510$_b$ (FIG. 5). The number M is a parameter of the BP algorithm that can be selected, e.g., for good performance at an acceptable processing delay (latency) and to meet applicable power-consumption limitations.

At step 708 of method 720 (FIG. 7B), NLIN-compensation module 330$_i$ operates to generate the sets $\{\tilde{x}^{(n)}\}$ and $\{\tilde{y}^{(n)}\}$ of frequency components by applying an FFT operation to the corresponding sequences of time-domain samples provided by digital input signals 502$_{ia}$ and 502$_{ib}$, respectively. In an example embodiment, step 708 can be performed using FFT modules 510$_a$ and 510$_b$ (FIG. 5).

At step 710, NLIN-compensation module 330$_i$ operates to generate the sets $\{\Delta\tilde{X}^{(n)}\}$ and $\{\Delta\tilde{Y}^{(n)}\}$ of NLIN estimates using the sets $\{\tilde{x}^{(n)}\}$ and $\{\tilde{y}^{(n)}\}$ of frequency components generated at step 708 and the values of $\tilde{\rho}_{h,k,m}$ generated at step 706. In an example embodiment, step 710 can be carried out using NLIN estimator 540 (FIGS. 5-6).

At step 712, NLIN-compensation module 330$_i$ operates to generate the sets $\{\tilde{X}^{(n)}\}$ and $\{\tilde{Y}^{(n)}\}$ of corrected frequency components using the sets $\{\tilde{x}^{(n)}\}$ and $\{\tilde{y}^{(n)}\}$ of frequency components generated at step 708 and the sets $\{\Delta\tilde{x}^{(n)}\}$ and $\{\Delta\tilde{y}^{(n)}\}$ of NLIN estimates generated at step 710. In an example embodiment, step 712 can be performed using adders 520$_a$ and 520$_b$ (FIG. 5).

At step 714, NLIN-compensation module 330$_i$ operates to generate two sequences of time-domain samples corresponding to the sets $\{\tilde{X}^{(n)}\}$ and $\{\tilde{Y}^{(n)}\}$, respectively, of corrected frequency components generated at step 712. In an example embodiment, step 714 can be performed using IFFT modules 530$_a$ and 530$_b$, and the two resulting sequences of corrected time-domain samples can be provided to downstream circuits by way of digital output signals 504$_{ia}$ and 504$_{ib}$, respectively, (see FIG. 5).

The processing of method 700 can then be directed back to step 708, e.g., to process a next block of time-domain samples supplied by digital input signals 502$_{ia}$ and 502$_{ib}$.

According to an example embodiment disclosed above in reference to FIGS. 1-7, provided is an apparatus (e.g., 100, FIG. 1) comprising: a coherent optical receiver (e.g., 190, FIG. 1) that includes an optical hybrid (e.g., 160, FIG. 1), a plurality of light detectors (e.g., 161, FIG. 1), a plurality of analog-to-digital converters (e.g., 166, FIG. 1), and a digital signal processor (e.g., 170, FIG. 1), the analog-to-digital converters being configured to output a stream (e.g., 168, FIG. 1) of digitalizations of measurements of two polarization components of a modulated optical carrier (e.g., 130', FIG. 1), the light detectors being configured to make the measurements on interferences of the modulated optical carrier produced by the optical hybrid; and wherein the digital signal processor comprises a first digital circuit (e.g., 220, FIG. 2) configured to estimate, from the stream of digitalizations, intra-channel nonlinear optical distortions of the modulated optical carrier in a polarization-mode-dispersion dependent manner that gives a lower weight to some contributions to the intra-channel nonlinear optical distortions caused by interactions between frequency components of the modulated optical carrier of larger intra-channel frequency difference than to other contributions to the intra-channel nonlinear optical distortions caused by interactions between frequency components of the modulated optical carrier of smaller intra-channel frequency difference.

In some embodiments of the above apparatus, the digital signal processor is configured to generate an estimate of the intra-channel nonlinear optical distortions for the two polarization components of the modulated optical carrier, the estimate being generated using two or more different approximations of an effect of polarization mode dispersion on the intra-channel nonlinear optical distortions within a bandwidth of the modulated optical carrier.

In some embodiments of any of the above apparatus, the digital signal processor is further configured to recover respective data encoded in the two polarization components of the modulated optical carrier, using the estimate.

In some embodiments of any of the above apparatus, the digital signal processor is further configured to switch between the two or more different approximations based on a comparison, with a fixed threshold value (e.g., $\Delta\omega_0$, FIG. 4), of a difference between frequencies of the frequency components of the modulated optical carrier contributing to the intra-channel nonlinear optical distortions.

In some embodiments of any of the above apparatus, the digital signal processor is further configured to: apply a first of the two or more approximations if an absolute value of a difference between frequencies of a first frequency component and a second frequency component is smaller than the fixed threshold value; and apply a second of the two or more approximations if the absolute value of the difference between the frequencies of the first frequency component and the second frequency component is greater than the fixed threshold value.

In some embodiments of any of the above apparatus, the digital signal processor is further configured to apply a third of the two or more approximations if the absolute value of the difference between the frequencies of the first frequency component and the second frequency component is smaller than the fixed threshold value, and an absolute value of a difference between frequencies of a third frequency component and the second frequency component is greater than the fixed threshold value.

In some embodiments of any of the above apparatus, the digital signal processor is configured to use three different approximations of the effect of polarization mode dispersion the intra-channel nonlinear optical distortions within the bandwidth of the modulated optical carrier.

In some embodiments of any of the above apparatus, the first digital circuit comprises: a second digital circuit (e.g., 510, FIG. 5) configured to apply a Fourier transformation to a sequence of signal samples (e.g., 502, FIG. 5) generated using the digitalizations to generate a corresponding set of frequency components e.g., $\{\tilde{x}^{(n)}\}$ and $\{\tilde{y}^{(n)}\}$, FIG. 5); and a third digital circuit (e.g., 540, FIG. 5) configured to estimate the intra-channel nonlinear optical distortions of the modulated optical carrier using the corresponding set of frequency components.

In some embodiments of any of the above apparatus, the first digital circuit further comprises a fourth digital circuit (e.g., 520, FIG. 5) configured to generate a set of corrected frequency components using an estimate of the intra-channel nonlinear optical distortions and the corresponding set of frequency components; and wherein the digital signal processor is configured to recover respective data encoded in the two polarization components of the modulated optical carrier, using the set of corrected frequency components.

In some embodiments of any of the above apparatus, the first digital circuit further comprises a fifth digital circuit (e.g., 530, FIG. 5) configured to apply an inverse Fourier transformation to the set of corrected frequency components to generate a sequence of corrected signal samples; and wherein the digital signal processor is configured to recover the respective data using the corrected signal samples.

In some embodiments of any of the above apparatus, the third digital circuit is operatively connected to a memory (e.g., 630, FIG. 6) configured to store therein digital values representing two or more different approximations of an effect of polarization mode dispersion on the intra-channel nonlinear optical distortions within a bandwidth of the modulated optical carrier; and wherein the third digital circuit is further configured to estimate the intra-channel nonlinear optical distortions of the modulated optical carrier using the digital values stored in the memory.

In some embodiments of any of the above apparatus, the first digital circuit is further configured to estimate the intra-channel nonlinear optical distortions of the modulated optical carrier using a backward-propagation algorithm corresponding to the modulated optical carrier.

In some embodiments of any of the above apparatus, the first digital circuit comprises two or more serially connected processing stages (e.g., $310_1$-$310_N$, FIG. 3), each configured to perform backward-propagation processing corresponding to a respective fiber-optic section traversed by the modulated optical carrier.

In some embodiments of any of the above apparatus, each of the two or more serially connected processing stages comprises: a respective dispersion-compensation module (e.g., $320_i$, FIG. 3) configured to perform dispersion-compensation processing on signal samples corresponding to the two polarization components of the modulated optical carrier; and a respective nonlinear-interference-noise-compensation module (e.g., $330_i$, FIG. 3) operatively connected to the respective dispersion-compensation module and configured to at least partially compensate the intra-channel nonlinear optical distortions caused by interactions between frequency components of the modulated optical carrier corresponding to the two polarization components thereof.

According to another example embodiment disclosed above in reference to FIGS. 1-7, provided is an apparatus (e.g., 100, FIG. 1) comprising: an optical transmitter (e.g., 110, FIG. 1) that includes a laser (e.g., 120, FIG. 1), a plurality of optical modulators (e.g., 124, FIG. 1), associated electrical drivers (e.g., 118, FIG. 1), and a digital signal processor (e.g., 112, FIG. 1), the optical transmitter being configured to modulate a digital symbol stream (e.g., 114, FIG. 1) onto two polarization components of an optical carrier generated by the laser in a manner that pre-compensates some intra-channel nonlinear optical distortions produced by transmission of a resulting modulated optical carrier over an optical fiber; and wherein the digital signal processor is electrically connected to control the associated electrical drivers and comprises a digital circuit (e.g., analogous to 330, FIG. 3) configured to estimate intra-channel nonlinear optical distortions during the transmission of the modulated optical carrier in a polarization-mode-dispersion dependent manner that gives a lower weight to some contributions to the intra-channel nonlinear optical distortions caused by interactions between frequency components of the modulated optical carrier of larger intra-channel frequency difference than to other contributions to the intra-channel nonlinear optical distortions caused by interactions between frequency components of the modulated optical carrier of smaller intra-channel frequency difference.

In some embodiments of the above apparatus, the digital signal processor is configured to generate an estimate (e.g., $\{\Delta\tilde{x}^{(n)}\}$ and $\{\Delta\tilde{y}(n)\}$, Eq. (8)) of the intra-channel nonlinear optical distortions for the two polarization components of the modulated optical carrier, the estimate being generated using two or more different approximations of an effect of polarization mode dispersion on the intra-channel nonlinear optical distortions within a bandwidth of the modulated optical carrier.

In some embodiments of any of the above apparatus, the digital signal processor is further configured to generate the estimate using a backward-propagation algorithm, the backward-propagation algorithm being configured to cause a pre-distortion of the modulated optical carrier that tends to be removed by the transmission thereof over the optical fiber.

In some embodiments of any of the above apparatus, the digital signal processor is further configured to switch between the two or more different approximations based on a comparison, with a fixed threshold value (e.g., $\Delta\omega_0$, FIG. 4), of a difference between frequencies of the frequency components of the modulated optical carrier contributing to the intra-channel nonlinear optical distortions.

In some embodiments of any of the above apparatus, the digital signal processor is further configured to: apply a first of the two or more approximations if an absolute value of a difference between frequencies of a first frequency component and a second frequency component is smaller than the fixed threshold value; and apply a second of the two or more approximations if the absolute value of the difference between the frequencies of the first frequency component and the second frequency component is greater than the fixed threshold value.

In some embodiments of any of the above apparatus, the digital signal processor is further configured to apply a third of the two or more approximations if the absolute value of the difference between the frequencies of the first frequency component and the second frequency component is smaller than the fixed threshold value, and an absolute value of a difference between frequencies of a third frequency component and the second frequency component is greater than the fixed threshold value.

According to yet another example embodiment disclosed above in reference to FIGS. 1-7, provided is an apparatus (e.g., 190, FIG. 1) comprising: an optical front-end circuit (e.g., 172, FIG. 1) configured to receive an optical communication signal (e.g., 130', FIG. 1); and a digital signal processor (e.g., 172, FIG. 1) operatively connected to the optical front-end circuit and configured to generate (e.g., at 710, FIG. 7) an estimate (e.g., $\{\Delta\tilde{x}^{(n)}\}$ and $\{\Delta\tilde{y}(n)\}$, Eq. (8)) of nonlinear interference noise for two orthogonal polarizations of the optical communication signal, the estimate being generated using two or more different approximations (e.g., in accordance with Eqs. (9a)-(9c)) of an effect of polarization mode dispersion on the nonlinear interference noise within a bandwidth of the optical communication signal.

In some embodiments of the above apparatus, the digital signal processor is further configured to recover data (e.g., 102, FIG. 1) encoded in the two orthogonal polarizations of the optical communication signal, using the estimate (e.g., at 712/714, FIG. 7).

In some embodiments of any of the above apparatus, the digital signal processor is further configured to: generate (e.g., at 712/714, FIG. 7) corrected signal samples (e.g., 504, FIG. 5) corresponding to the two orthogonal polarizations of the optical communication signal using the estimate; and recover data (e.g., 102, FIG. 1) encoded in the two orthogonal polarizations of the optical communication signal, using the corrected signal samples.

In some embodiments of any of the above apparatus, the digital signal processor is further configured to switch between the two or more different approximations based on a comparison, with a fixed threshold value (e.g., $\Delta\omega_0$, FIG. 4), of a difference between frequencies of optical waves contributing to the nonlinear interference noise.

In some embodiments of any of the above apparatus, the digital signal processor is further configured to: apply a first (e.g., in accordance with Eq. (9a)) of the two or more approximations if an absolute value of a difference between frequencies of a first optical wave and a second optical wave is smaller than the fixed threshold value; and apply a second (e.g., in accordance with Eq. (9c)) of the two or more approximations if the absolute value of the difference between the frequencies of the first optical wave and the second optical wave is greater than the fixed threshold value.

In some embodiments of any of the above apparatus, the digital signal processor is further configured to apply a third (e.g., in accordance with Eq. (9b)) of the two or more approximations if the absolute value of the difference between the frequencies of the first optical wave and the second optical wave is smaller than the fixed threshold value, and an absolute value of a difference between frequencies of a third optical wave and the second optical wave is greater than the fixed threshold value.

In some embodiments of any of the above apparatus, the digital signal processor is configured to use three different approximations (e.g., defined by Eqs. (9a)-(9c)) of the effect of polarization mode dispersion on the nonlinear interference noise within the bandwidth of the optical communication signal.

In some embodiments of any of the above apparatus, the digital signal processor comprises: a first digital circuit (e.g., 510, FIG. 5) configured to apply a Fourier transformation (e.g., at 708, FIG. 7) to a sequence of signal samples (e.g., 502, FIG. 5) to generate a corresponding set of frequency components (e.g., $\{\tilde{x}^{(n)}\}$ and $\{\tilde{y}^{(n)}\}$, FIG. 5); and a second digital circuit (e.g., 540, FIG. 5) configured to generate the estimate using the corresponding set of frequency components.

In some embodiments of any of the above apparatus, the digital signal processor further comprises a third digital circuit (e.g., 520, FIG. 5) configured to generate (e.g., at 712, FIG. 7) a set of corrected frequency components using the estimate and the corresponding set of frequency components; and wherein the digital signal processor is configured to recover data (e.g., 102, FIG. 1) encoded in the two orthogonal polarizations of the optical communication signal, using the set of corrected frequency components.

In some embodiments of any of the above apparatus, the digital signal processor further comprises a fourth digital circuit (e.g., 530, FIG. 5) configured to apply an inverse Fourier transformation (e.g., at 714, FIG. 7) to the set of corrected frequency components to generate a sequence of corrected signal samples (e.g., 504, FIG. 5); and wherein the digital signal processor is configured to recover the data using the corrected signal samples.

In some embodiments of any of the above apparatus, the second digital circuit is operatively connected to a memory (e.g., 630, FIG. 6) configured to store therein digital values (e.g., $\tilde{\rho}_{h,k,m}$, Eqs. (9a)-(9c)) representing the two or more different approximations; and wherein the second digital circuit is further configured to generate the estimate using the digital values stored in the memory (e.g., as shown in FIG. 6).

In some embodiments of any of the above apparatus, the digital signal processor is further configured to generate the estimate using a backward-propagation algorithm (e.g., implemented using 220, FIG. 2) corresponding to the optical communication signal.

In some embodiments of any of the above apparatus, the digital signal processor comprises two or more serially connected processing stages (e.g., $310_1$-$310_N$, FIG. 3), each configured to perform backward-propagation processing corresponding to a respective fiber-optic section (e.g., $142_i$, FIG. 1) traversed by the optical communication signal, the backward propagation processing being configured to at least partially compensate the effect of polarization mode dispersion on the nonlinear interference noise, said effect being imposed by the respective fiber-optic section.

In some embodiments of any of the above apparatus, each of the two or more serially connected processing stages comprises: a respective dispersion-compensation module (e.g., $320_i$, FIG. 3) configured to perform dispersion-compensation processing on signal samples (e.g., 212/312, FIG. 3) corresponding to the two orthogonal polarizations of the optical communication signal; and a respective nonlinear-interference-noise-compensation module (e.g., $330_i$, FIG. 3)

operatively connected to the respective dispersion-compensation module and configured to at least partially compensate the nonlinear interference noise corresponding to the two orthogonal polarizations of the optical communication signal using the two or more different approximations.

According to yet another example embodiment disclosed above in reference to FIGS. 1-7, provided is an apparatus (e.g., 110, FIG. 1) comprising: an optical front-end circuit (e.g., 116, FIG. 1) configured to transmit an optical communication signal (e.g., 130, FIG. 1); and a digital signal processor (e.g., 112, FIG. 1) operatively connected to the optical front-end circuit and configured to generate an estimate (e.g., $\{\Delta\tilde{x}^{(n)}\}$ and $\{\Delta\tilde{y}^{(n)}\}$, Eq. (8)) of nonlinear interference noise for two orthogonal polarizations of the optical communication signal, the estimate being generated using two or more different approximations (e.g., in accordance with Eqs. (9a)-(9c)) of an effect of polarization mode dispersion on the nonlinear interference noise within a bandwidth of the optical communication signal.

In some embodiments of the above apparatus, the optical front-end circuit is configured to apply the optical communication signal to an optical transport link (e.g., 140, FIG. 1) for propagation therethrough; and wherein the digital signal processor is further configured to generate the estimate using a backward-propagation algorithm, the backward-propagation algorithm being configured to cause a pre-distortion of the optical communication signal that tends to be removed by the propagation.

In some embodiments of any of the above apparatus, the digital signal processor is further configured to switch between the two or more different approximations based on a comparison, with a fixed threshold value (e.g., $\Delta\omega_0$, FIG. 4), of a difference between frequencies of optical waves contributing to the nonlinear interference noise.

In some embodiments of any of the above apparatus, the digital signal processor is further configured to: apply a first (e.g., in accordance with Eq. (9a)) of the two or more approximations if an absolute value of a difference between frequencies of a first optical wave and a second optical wave is smaller than the fixed threshold value; and apply a second (e.g., in accordance with Eq. (9c)) of the two or more approximations if the absolute value of the difference between the frequencies of the first optical wave and the second optical wave is greater than the fixed threshold value.

In some embodiments of any of the above apparatus, the digital signal processor is further configured to apply a third (e.g., in accordance with Eq. (9b)) of the two or more approximations if the absolute value of the difference between the frequencies of the first optical wave and the second optical wave is smaller than the fixed threshold value, and an absolute value of a difference between frequencies of a third optical wave and the second optical wave is greater than the fixed threshold value.

In some embodiments of any of the above apparatus, the digital signal processor is configured to use three different approximations (e.g., defined by Eqs. (9a)-(9c)) of the effect of polarization mode dispersion on the nonlinear interference noise within the bandwidth of the optical communication signal.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus comprising:
an optical transmitter that includes a laser, a plurality of optical modulators, associated electrical drivers, and a digital signal processor, the optical transmitter being configured to modulate a digital symbol stream onto two polarization components of an optical carrier generated by the laser in a manner that pre-compensates some intra-channel nonlinear optical distortions produced by transmission of a resulting modulated optical carrier over an optical fiber;
wherein the digital signal processor is electrically connected to control the associated electrical drivers and comprises a digital circuit configured to estimate intra-channel nonlinear optical distortions during the transmission of the modulated optical carrier in a polarization-mode-dispersion dependent manner that gives a lower weight to some contributions to the intra-channel nonlinear optical distortions caused by interactions between frequency components of the modulated optical carrier of larger intra-channel frequency difference than to other contributions to the intra-channel nonlinear optical distortions caused by interactions between frequency components of the modulated optical carrier of smaller intra-channel frequency difference; and
wherein the digital signal processor is configured to generate an estimate of the intra-channel nonlinear optical distortions for the two polarization components of the modulated optical carrier based on a comparison, with a fixed threshold value, of a difference between frequencies of the frequency components of the modulated optical carrier contributing to the intra-channel nonlinear optical distortions.

2. The apparatus of claim 1, wherein the digital signal processor is configured to generate the estimate using two or more different approximations of an effect of polarization mode dispersion on the intra-channel nonlinear optical distortions within a bandwidth of the modulated optical carrier.

3. The apparatus of claim 2, wherein the digital signal processor is further configured to generate the estimate using a backward-propagation algorithm, the backward-propagation algorithm being configured to cause a pre-distortion of the modulated optical carrier that tends to be removed by the transmission thereof over the optical fiber.

4. The apparatus of claim 2, wherein the digital signal processor is further configured to switch between the two or more different approximations based on the comparison.

5. The apparatus of claim 4, wherein the digital signal processor is further configured to:
apply a first of the two or more approximations if an absolute value of a difference between frequencies of a first frequency component and a second frequency component is smaller than the fixed threshold value; and
apply a second of the two or more approximations if the absolute value of the difference between the frequencies of the first frequency component and the second frequency component is greater than the fixed threshold value.

6. The apparatus of claim 5, wherein the digital signal processor is further configured to apply a third of the two or more approximations if the absolute value of the difference between the frequencies of the first frequency component and the second frequency component is smaller than the fixed threshold value, and an absolute value of a difference between frequencies of a third frequency component and the second frequency component is greater than the fixed threshold value.

* * * * *